May 28, 1963

R. PELLETIER 3,091,037

HIGH LIQUID LEVEL INDICATING GAUGE

Filed July 3, 1961

INVENTOR
Regent PELLETIER
BY

ATTORNEYS

May 28, 1963   R. PELLETIER   3,091,037
HIGH LIQUID LEVEL INDICATING GAUGE
Filed July 3, 1961   2 Sheets-Sheet 2
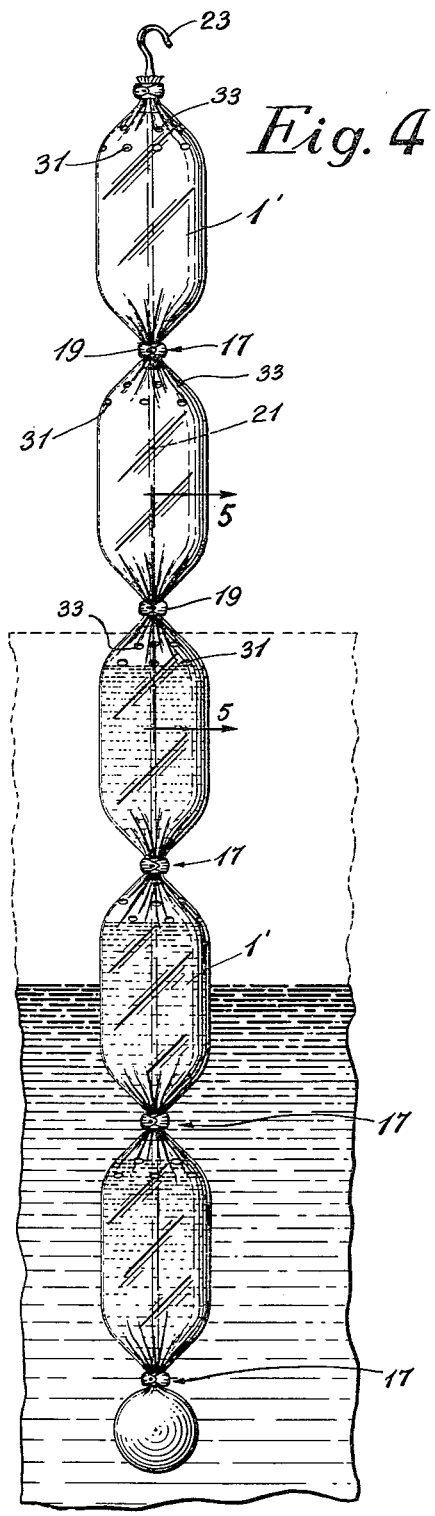
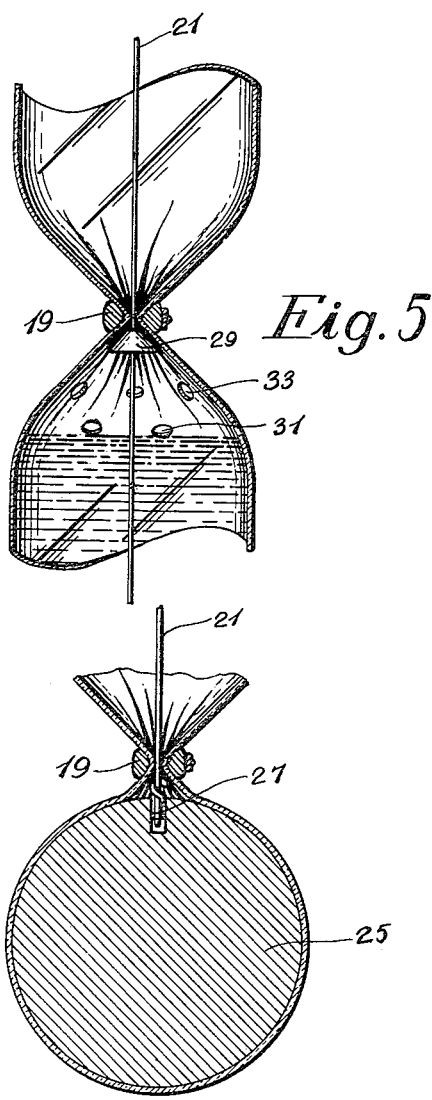
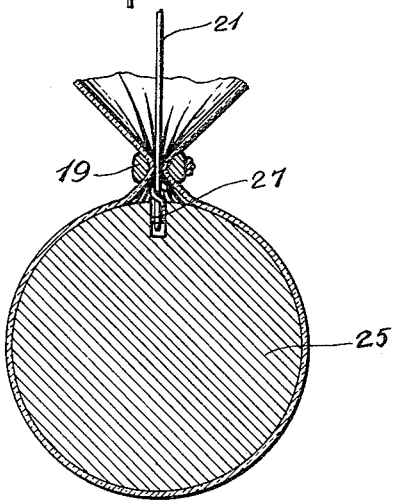
INVENTOR
Régent PELLETIER
BY
ATTORNEYS

United States Patent Office 3,091,037
Patented May 28, 1963

3,091,037
HIGH LIQUID LEVEL INDICATING GAUGE
Régent Pelletier, Riviere du Loup, Quebec, Canada
Filed July 3, 1961, Ser. No. 121,470
3 Claims. (Cl. 33—126.4)

This invention pertains to a high liquid level indicating gauge and more particularly to an article that can give an approximate indication of the maximum height the liquid under study has reached over a period of time.

One very useful field of application for devices of the aforesaid type is in sewage systems of large cities particularly, where data as to the maximum level of water in sewage pipes at various locations in the city is to be collected. After heavy rains or during spring thaw, it is often desired to know what high levels are reached at different key locations so that if any remedial action is necessary, it can be taken with full knowledge of the peak conditions in the sewers.

This indicator must meet certain requirements in order to be acceptable: perhaps the most important being its cost. Because the more of these indicators there are in a given system, the more reliable and accurately interpreted the information can be, the indicator must be of cheap manufacture, therefore simple in structure and of low cost, non-corrosive material. Other requirements are that they be easily installed and maintained as well as easily read.

The device of the invention meets the above-mentioned requirements as it simply consists of a string of small containers, each one of which is perforated at the upper and/or central portions thereof to permit penetration of the water. The string is held preferably vertically in the sewer and the uppermost container in which there is water gives an approximate indication of the maximum level reached. The degree of accuracy of such an indicator depends on the spacing from one container to the next.

Description of the invention will now proceed, having regard to the annexed drawings wherein:

FIG. 4 is an elevation view of a further embodiment of the invention;

FIG. 5 is a cross-section view along line 5—5 of FIG. 4;

FIG. 6 is a cross-section view showing how this particular embodiment is tied to a weighing means.

Figure 1:
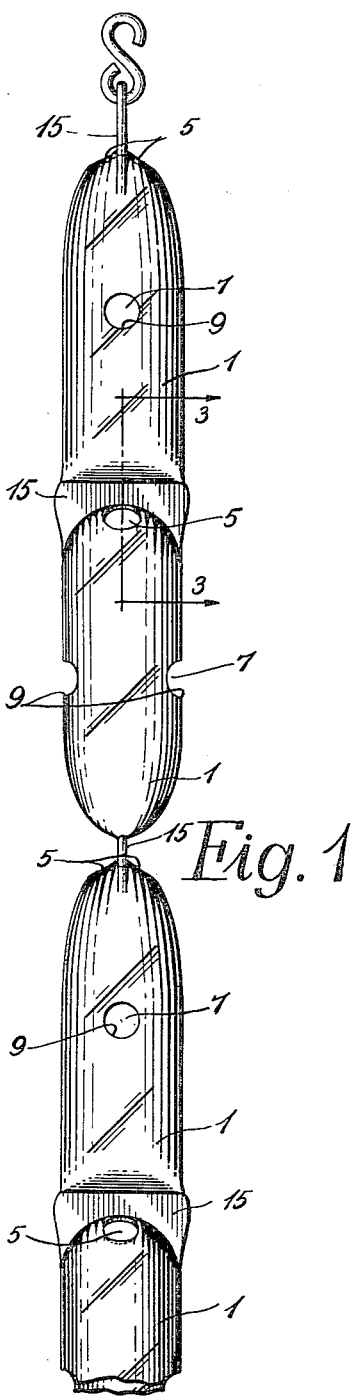
FIG. 1 is an elevation view of one embodiment of the invention.
Figure 2:
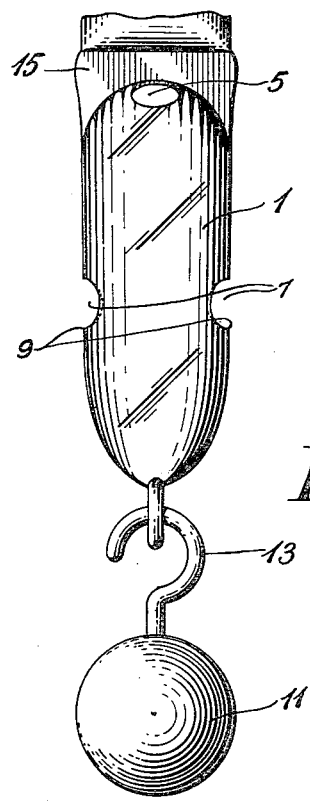
FIG. 2 shows a last container of a string of containers with a weighing means attached thereto.
Figure 3:
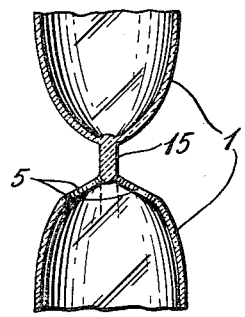
FIG. 3 is a view in cross-section along line 3—3 of FIG. 1.

In FIGS. 1, 2 and 3 the indicator is shown as a string of containers 1 joined in end-to-end relationship. Each container has a plurality of apertures for the ingress and egress of water. The preferred distribution of the apertures is that shown wherein a set of holes 5 are located at the upper portion of the container and another set 7 about the central portion thereof. In use, the maximum level of the water is indicated by the uppermost container having water. Of course, the water level in that container, if the level has dropped before readings are taken, will be at the lowermost point 9 of holes 7. This means that the maximum level was anywhere between that particular point and the corresponding point 9 of the next upper hole 7. Therefore, the most accurate reading will be that taken at mid-distance between two consecutive points 9, that is in the crimp 15.

Holes 7 also serve to let air into the containers when they are being emptied; holes 5 serving for the egress of the liquid when the indicator is turned upside down.

Any suitable anchoring means such as weighing sphere 11 and hook 13 can be used, in conjunction with a hanging device, to hold the string of containers upright in the liquid.

The indicator can be made of plastic tubing such as medium gauge vinyl or polyethylene and should preferably be transparent or translucent. This tubing is heat sealed at spaced intervals along the axis thereof; these crimps or seals 15 creating the required containers. It has also been found advantageous to dispose consecutive seals at right angles to prevent collapsing of individual cell or container.

A further embodiment is that shown in FIGS. 4, 5 and 6.

In this case, the indicator is made of material which is sufficiently flexible so that it can be clamped at spaced locations 17 by means of a clamping collar 19. Yet, the material should have sufficient rigidity that the containers 1' retain their shape.

Since the tubing used in this case is of flexible, or semi-rigid material, it is preferable that a stiffening wire 21 be used to prevent collapsing of the containers by stretching of the string under the weight of water or the liquid under consideration. This wire 21 will traverse all of the containers and be tied, at one end, to hanging means 23 and, at the other end, to weighing or anchoring means 25. An example of the connection to the weighing means 25 is shown at 27 in FIG. 6.

Collapse of the containers is also prevented by the use of conical supporting elements 29 (see FIG. 5) located at spaced intervals along wire 21; the spacing being that of tightening or clamping collars 19. In fact clamping collars 19 actually tighten the end wall of containers 1' against the lateral surface of the conical supporting elements 29.

In this case the holes for the penetration of liquid are distributed on two rows 31, 33 at the upper portion of the containers. It will be appreciated that the same arrangement of holes as that of FIG. 1 can be resorted to with equal success.

With regard to anchoring of the indicator, the latter may be tied to the bottom of the liquid carrier, if it is deemed that the current therein is too strong.

In order to make accurate readings, it is not necessary that the gauge be held absolutely vertically. Only the measurement need be done along a vertical line. This will be expressed in the claims by the expression: "substantially vertically."

The scope of the invention should not be construed from the above non-limitative examples of realisation but rather from the appended claims.

I claim:

1. A high liquid level indicating gauge, comprising: a flexible tubular member; clamping means located at spaced intervals along the axis of said member for closing the latter to form a plurality of containers arranged in a string intended to stand substantially vertically in a liquid to measure its maximum level; apertures through the wall of each container at the upper end thereof for the ingress and egress of the liquid; hanging means at one end of said member whereby said string of containers may be hung vertically in a liquid to measure its maximum level.

2. A high liquid level indicating gauge, comprising: a flexible tubular member; a wire within said member and coaxial therewith; a plurality of conical elements spaced along said wire and secured thereto; clamping means, one for each conical element, closing said flexible member over the lateral wall of said conical elements to form a series of containers arranged in a string intended to stand substantially vertically in a liquid to measure its maximum level; apertures through the wall of each container, at the upper end thereof, for the ingress and egress of the liquid; hanging means at one end of said member fixed to one end of said wire whereby said string of containers may be hung substantially vertically in a liquid to measure its maximum level.

3. A high liquid level indicating gauge, comprising: a plastic tubular member; crimps located at spaced intervals along said member for closing it to form a plurality of containers arranged in a string intended to stand substantially vertically in a liquid to measure its maximum level; apertures through the wall of each container at the upper and central portions thereof for the ingress and egress of the liquid, hanging means at one end of said member whereby said string of containers may be hung substantially vertically in a liquid to measure its maximum level.

References Cited in the file of this patent

UNITED STATES PATENTS

| | | |
|---|---|---|
| 480,058 | Barker | Aug. 2, 1892 |
| 1,558,490 | Mayberry | Oct. 27, 1925 |
| 2,099,803 | Eynon | Nov. 23, 1937 |